3,025,253
VINYL ACETATE COPOLYMER COMPOSITIONS
John Edwin Oakley Mayne, Henry Warson, and Ralph Manuel Levine, Carshalton, England, assignors to Vinyl Products Limited, Carshalton, England, a British company
No Drawing. Filed Mar. 4, 1959, Ser. No. 797,054
Claims priority, application Great Britain Mar. 7, 1958
8 Claims. (Cl. 260—23)

The present invention is for improvements in or relating to vinyl acetate copolymer compositions and has for an object to provide compositions in which drying oils are admixed with the vinyl acetate copolymers to provide products which yield a substantially compatible film on drying of the drying oil component of the composition.

Polyvinyl acetate itself appears to be wholly incompatible with drying oils so that mixtures of polyvinyl acetate with, for example, linseed oil do not form a useful coating composition.

The invention is based on our discovery that copolymers of vinyl acetate with copolymerizable esters, particularly the vinyl esters of higher fatty acids, do have a substantial compatibility towards drying oils.

According to the present invention, therefore, there is provided a vinyl acetate copolymer composition comprising a copolymer of vinyl acetate with a copolymerizable ester in admixture with a drying or semi-drying oil in an amount such as to produce a substantially compatible dried film. The copolymer and the oil may be admixed as such or they may be dissolved in a mutual solvent or emulsified in an aqueous medium. The copolymerizable ester may be either a vinyl ester of a fatty acid containing at least four carbon atoms in the molecule or it may be an alkyl di-ester of an unsaturated polybasic carboxylic cid such as a maleate, fumarate or itaconate; esters of unsaturated acids such as acrylates may also be employed. The alkyl groups in the copolymerizable esters also preferably contain at least four carbon atoms.

The invention includes coating compositions comprising the vinyl acetate copolymer compositions, above referred to, together with a pigment and/or filler.

The invention further includes a method of forming a vinyl acetate copolymer emulsion composition which comprises dispersing a drying or semi-drying oil in an aqueous emulsion of a copolymer of vinyl acetate as above referred to either with or without the assistance of an anionic or a non-ionic emulsifying agent.

We have found that there is a relationship between the "carbon number" of the vinyl acetate copolymers and their compatibility with the oils. The term "carbon number" is an expression which denotes the average length of the side chains attached to the polymer chain. For example, the polymer chain of polyvinyl acetate itself is composed of the pairs of carbon atoms constituting the vinyl group and the side chains are the acetate radical so that the carbon number of polyvinyl acetate itself is 2. Where longer chain fatty acid vinyl esters are employed the carbon number of the copolymer can be calculated so that, for example, a copolymer of 4 moles of vinyl acetate and 1 mole of vinyl laurate (lauric acid containing 12 carbon atoms) has an average carbon number of 4. We find that where the copolymerizable ester is an ester of a polycarboxylic unsaturated acid then each esterifying group must be separately assessed since the unsaturated acid residue forms part of the polymer chain and it is the ester groups which constitute the side chain. For example, in the case of dioctyl fumarate when copolymerized in equimolecular proportions with vinyl acetate, the average carbon number of the copolymer is 6.

The carbon number at which the maximum compatibility by weight of drying oil on resin copolymer varies both with the copolymer and with the drying oil.

The compatibility of polyvinyl acetate with drying oils is virtually zero. As the carbon number of the side chains as above defined increases, then the compatibility with drying oils increases also. This increase does not continue indefinitely. Thus, in the case of copolymers of vinyl acetate and a technical vinyl caprate, a maximum compatibility of about equal parts of linseed oil and copolymer is found between a carbon number of about 4 and 5.

It must be emphasized that the term "compatibility" refers to the stoved or otherwise dried film and not to the undried oil. The term "dried" is here used in the same sense as is conventional with the drying of drying oils and may be accomplished by air exposure at normal ambient temperatures with or without the addition of metallic driers or by heating at elevated temperatures (stoving) with or without the addition of metallic driers following well-known techniques in the art of drying oil coating compositions.

The compatibility or otherwise is assessed by visual inspection of the film. When films from the compositions of the invention, which are normally applied by means of a brush but may be sprayed or applied by other well-known methods, are found to be clear, glossy and apparently homogeneous after drying, they are designated as "compatible." Incompatible films are hazy, tend to break up to a rather "cheesy" mass and often contain irregular patches of the oil which has sweated out. There is, of course, a boundary area on the verge of compatibility and compositions in this boundary area may have utility, for example, in pigmented finishes, especially if these are of a matt character or are designed for undercoats. With the higher range of carbon numbers, the region at the verge of compatibility is broader than with carbon numbers a little over 2, and assessment of these limiting regions may vary with the operator or with slight differences of the quality of natural oils, molecular weight of the polymer and on drying conditions.

Linseed oil is one of the most useful oils for admixture with the vinyl acetate copolymers in carrying out the invention. Tung oil may also be used but the amounts of this oil which may satisfactorily be admixed with the vinyl resins are about one-third of those which may be used with linseed oil, whilst compatibilities with dehydrated castor oil are of the order of half to sixty percent of those obtained with linseed oil.

Where emulsions are used, the drying oil may be suitably emulisfied in a copolymer emulsion by various well-known methods. Thus, in the simplest case, the drying oil is added in a slow stream to the copolymer emulsion with rapid stirring and, if desired, an elevated temperature may be used, usually about 50° C. Since vinyl acetate copolymer emulsions, as normally available, are of about 55% solids content or even higher, it is often desirable to add water to the emulsion first so that the final solids content of the final emulsion will still be between 50% and 60%. If necessary, non-ionic emulsifying agents may be added to the emulsion before addition of the drying oil or, if preferred, other types of emulsifying agents such as the well-known sulfated or sulfonated soaps may be used. It will be appreciated that cationic emulsifying agents may be employed where the oil is added to a positively-charged emulsion although this latter is not the normal practice. It is recommended, although not essential, that the final emulsions should be stored for several hours before testing or using.

The compositions of the present invention may be used for surface coatings of various types, pigmented or unpigmented, and the level of pigmentation may vary. The compositions are particularly useful for pigmented undercoats.

A particularly useful series of copolymers consists of vinyl acetate with a vinyl ester of commercial capric acid which consists of about 40% caprylic acid, 50% capric acid and 10% lauric acid. A typical formula for the production of such a copolymer emulsion is shown below. Another very useful series consists of copolymers of vinyl acetate and vinyl stearate. It may be generally postulated that when the carbon number as hitherto defined does not exceed 3, then the compatibility with drying oils is roughly related to the carbon number, divergencies being slight, but compatibility tending to increase with increasing chain length of the copolymerizing monomer. When the carbon number exceeds 3, then compatibility increases more markedly when a vinyl ester of a higher fatty acid is copolymerized than with a lower fatty acid. Thus with an average carbon number of 4 the compatibility of a copolymer of vinyl acetate and vinyl caprate with linseed oil is about 1:1, whilst a corresponding copolymer containing vinyl stearate has a compatibility with linseed oil of about 1:1½.

The compatibility of the vinyl ester copolymers does not increase indefinitely with increasing carbon number. Thus with the vinyl caprate copolymer, it is found that a copolymer of carbon number 5 has the same compatibility approximately as a copolymer with carbon number 4, after which compatibility decreases, finally dropping to zero at 100% vinyl caprate polymer. It must be observed, however, that above a carbon number of 4, the utility of the invention decreases. This is because of the increasing tackiness of the compositions. Thus the invention may be considered to be of practical utility only where the carbon number, as hitherto defined, is 6 or below, and especially where the carbon number is below 5. Unless a rather tacky film is required, or the composition is heavily loaded with pigment, then the main utility of the compositions will be for copolymers of carbon number below 4.

When copolymers of vinyl acetate with vinyl stearate are compounded with linseed oil, then compatibilities are approximately the same up to a carbon number of 3; after this, compatibility increases more rapidly than with the vinyl caprate with increasing carbon number, until at a carbon number of 4, 150 parts of linseed oil gives compatibility with 100 parts of copolymer. If the carbon number of this copolymer is increased to above 5, then the copolymer itself acquires the crystalline or waxy properties which are characteristic of vinyl stearate and compatibilities have little meaning above this carbon number.

Where copolymers of vinyl acetate with vinyl myristate are used, then the compatibility is in general between that of vinyl stearate and vinyl caprate copolymers.

Copolymers of vinyl acetate with maleates and fumarates also have come compatibility with linseed oil although this compatibility is of a lower order than higher vinyl esters of corresponding carbon number.

One advantage of the compositions described is that their pigment binding properties are better than that of unmodified polyvinyl acetate and that they adhere better to an old paint surface.

By way of example, the preparation of a suitable copolymer of vinyl acetate and vinyl caprate (the caprate being derived from technical capric acid as heretofore defined) may be prepared.

| | |
|---|---|
| Mixed vinyl monomers | 100 parts by weight. |
| Hydroxyethyl cellulose | 2.75 parts by weight. |
| Dodecyl toluene sulphonic acid sodium salt | 0.1 part by weight. |
| A polyethylene oxide alkyl ether (sold under the registered trademark "Texofor B1") | 1 part by weight. |
| Sodium bicarbonate | 0.3 part by weight. |
| Potassium persulphate | 0.6 part by weight. |
| Water | To give a final emulsion of a solids content of 56.5%. |

The mixed monomers consist of varying ratios of vinyl acetate and vinyl caprate, from zero vinyl acetate to 100% vinyl caprate.

Polymerization is effected by dissolving all water-soluble ingredients in the water in a glass or stainless steel vessel equipped with stirrer, a reflux condenser and inlets for controlled addition. 2% of the mixed monomers are added at 60° C., heating being continued until polymerization commences and the remaining monomers added in a slow stream over about 2½ hours at 70°–75° C., thereafter heating to 90° C. for 15 minutes, finally air-blowing to remove unreacted monomers as far as possible. On cooling, the product is a typical copolymer emulsion and the properties of the film deposited depend on the degree of addition of vinyl caprate, about 15% of total vinyl caprate producing a tough and flexible continuous film at ambient temperatures. The linseed oil or other drying oil or modified drying oil may be emulsified into the emulsion in a number of ways. The oil may be stirred into the emulsion in a thin stream, maintaining stirring for about 10 minutes and continuing for 2 hours. If the solids content of the emulsion is raised much above 60%, then it may be desirable to add water to the emulsion before adding the drying oil. It should not be necessary to add further emulsifying agents before adding the drying oil, but there is no reason why anionic or non-ionic agents should not be added if desired. Driers may be added, either by prior dissolving into the oil, or by direct addition to the emulsion, or a commercial drier emulsion may be added. The presence of solvents is not excluded, although this should not be necessary.

Tung oil is more difficult to emulsify than linseed oil and it may be desirable to emulsify at about 50° C. or by the addition of several percent of non-ionic emulsifying agent.

The properties of various vinyl acetate copolymers in respect of their compatibility to linseed and other oils are set out in the following tables.

(In each of the tables, the figures in column A represent the percentage by weight of the copolymerizable ester copolymerized with the vinyl acetate, those in column B represent the ratio of molecules of vinyl acetate to the copolymerizable ester, those in C represent the average carbon number of the copolymer and those in D the maximum tolerance for the oil to produce a clear film on drying expressed as the percentage of oil by weight of the total weight of oil and copolymer.)

*Table 1*

[Copolymerizable ester: vinyl caprate, oil is acid-refined linseed oil.]

| A | B | C | D |
|---|---|---|---|
| 0 | ∞ | 2.00 | 0 |
| 4 | 55.25 | 2.14 | 6.25 |
| 8 | 26.5 | 2.29 | 7.5 |
| 15 | 13.8 | 2.54 | 12.5 |
| 20 | 9.2 | 2.79 | 15 |
| 25 | 6.9 | 3.01 | 22.5 |
| 30 | 5.37 | 3.26 | 35 |
| 40 | 3.46 | 3.79 | 50 |
| 50 | 2.30 | 4.43 | 50 |
| 60 | 1.53 | 5.16 | 42.5 |
| 70 | 0.986 | 6.03 | 32.5 |
| 75 | 0.767 | 6.54 | 22.5 |

*Table 2*

[Copolymerizable ester: vinyl stearate, oil is acid-refined linseed oil.]

| A | B | C | D |
|---|---|---|---|
| 10 | 32.45 | 2.48 | 12.5 |
| 15 | 20.41 | 2.74 | 17.5 |
| 20 | 14.4 | 3.02 | 45 |
| 25 | 10.83 | 3.55 | 55 |
| 30 | 8.41 | 3.70 | ? |

The increasing tendency to crystallinity of the copolymers with increase in content of vinyl stearate renders it impossible to determine compatibility above the figure of 25% vinyl stearate.

*Table 3*

[Oil is acid-refined linseed oil]

| Copolymerizable ester | A | B | C | D |
|---|---|---|---|---|
| Vinyl myristate | 25 | 8.86 | 3.22 | 40 |
| Dibutyl maleate | 30 | 10.6 | 2.73 | 20 |
| Dibutyl fumarate | 30 | 10.6 | 2.73 | 17.5 |
| Dioctyl maleate | 20 | 19.75 | 2.785 | 12.5 |

*Table 4*

[Copolymer: vinyl acetate—vinyl caprate]

| Drying oil | A | B | C | D |
|---|---|---|---|---|
| Tung oil | 8 | 26.5 | 2.27 | 5 |
| Tung oil | 25 | 6.9 | 3.01 | 10 |
| Tung oil | 40 | 3.46 | 3.79 | 20 |
| D.C.O. | 8 | 26.5 | 2.29 | 7.5 |
| D.C.O. | 25 | 6.9 | 3.01 | 17.5 |
| D.C.O. | 40 | 3.46 | 3.79 | 40 |

In the preceding table, D.C.O. signifies dehydrated castor oil of a viscosity of 1½ poises at 25° C.

The oils employed in the process of the invention are preferably unbodied, i.e. of low viscosity, since we have found that the bodied oils were of greatly reduced compatibility with the vinyl acetate copolymers. For example, 30 poise and 150 poise linseed stand oils both had a compatibility (D) of less than 2½% even with the vinyl acetate copolymers containing as much as 40% by weight of vinyl caprate and similarly the vinyl ester copolymer with 25% by weight of vinyl stearate had a compatibility of less than 2½% with a 30-poise linseed stand oil.

We claim:

1. A vinyl acetate copolymer-drying oil composition comprising a copolymer of vinyl acetate with a copolymerizable ester selected from the group consisting of vinyl esters of saturated fatty acids containing at least four carbon atoms in the acid radical, alkyl diesters of unsaturated polycarboxylic acids containing at least four carbon atoms in each alkyl radical and alkyl esters of monocarboxylic unsaturated aliphatic acids containing at least four carbon atoms in the alkyl radical in admixture with a drying oil, the ratio of the vinyl acetate units in said copolymer to the units of said copolymerizable ester being such that the average number of carbon atoms in the saturated side chains to the linear chain of said copolymer is greater than 2 but not greater than 6, in admixture with an amount of a drying oil such as to produce a substantially compatible film on drying of the copolymer-drying oil composition.

2. A composition according to claim 1 wherein said composition is dissolved in a mutual solvent.

3. A composition according to claim 1 wherein said composition is dispersed in an aqueous medium.

4. A surface-coating composition comprising a vinyl acetate copolymer-drying oil composition as claimed in claim 1 in admixture with at least one finely divided solid selected from the class consisting of pigments, fillers and extenders.

5. A vinyl acetate copolymer-drying oil composition comprising a vinyl acetate-vinyl caprate copolymer containing from 15% to 60% by weight of vinyl caprate and from about 12.5% to about 50% by weight of linseed oil uniformly dispersed in said copolymer.

6. A vinyl acetate copolymer-drying oil composition comprising a vinyl acetate-vinyl stearate copolymer containing from 10% to 25% by weight of vinyl stearate and from about 12.5% to about 55% by weight of linseed oil uniformly dispersed in said copolymer.

7. A method of forming a vinyl acetate copolymer emulsion composition which comprises dispersing a drying oil in an aqueous emulsion of a vinyl acetate copolymer with a copolymerizable ester selected from the group consisting of vinyl esters of fatty acids containing at least four carbon atoms in the acid radical, alkyl diesters of unsaturated polycarboxylic acids containing at least four carbon atoms in each alkyl radical and alkyl esters of monocarboxylic unsaturated aliphatic acids containing at least four carbon atoms in the alkyl radical, the ratio of the vinyl acetate units in said copolymer to the units of said copolymerizable ester being such that the average number of carbon atoms in the saturated side chains to the linear chain of said copolymer is greater than 2 but not greater than 6.

8. A method according to claim 7 wherein the dispersion is effected with the assistance of an emulsifying agent.

References Cited in the file of this patent

UNITED STATES PATENTS

| | | |
|---|---|---|
| 2,118,864 | Reppe et al. | May 31, 1938 |
| 2,413,259 | Soday | Dec. 24, 1946 |
| 2,453,570 | Debacher | Nov. 9, 1948 |
| 2,781,386 | Culemeyer | Feb. 12, 1957 |